D. D. & P. J. SPRAGUE,

Assignors to themselves and C. D. SPRAGUE.

STRAW STACKER FOR THRASHING MACHINES.

No. 10,406. Reissued Nov. 20, 1883.

Attest:
Charles Pickles
Wm. J. Sayers

Inventors.
D. D. Sprague
P. J. Sprague
By Knight Bros
Attys

UNITED STATES PATENT OFFICE.

DUDLEY D. SPRAGUE, OF CALIFORNIA, AND PEARLEY J. SPRAGUE, OF HIGBEE, MISSOURI, ASSIGNORS TO THEMSELVES AND CHARLES D. SPRAGUE, OF SEDALIA, MISSOURI.

STRAW-STACKER FOR THRASHING-MACHINES.

SPECIFICATION forming part of Reissued Letters Patent No. 10,406, dated November 20, 1883.

Original No. 261,778, dated July 25, 1882. Application for reissue filed July 20, 1883.

*To all whom it may concern:*

Be it known that we, DUDLEY D. SPRAGUE, of California, Moniteau county, State of Missouri, and PEARLEY J. SPRAGUE, of Higbee, Randolph county, Missouri, have invented a certain new and useful Improvement in Straw-Stackers for Thrashing-Machines, of which the following is a full, clear, and exact description, reference being had to the accompanying drawings, forming part of this specification, in which—

Figure 1:
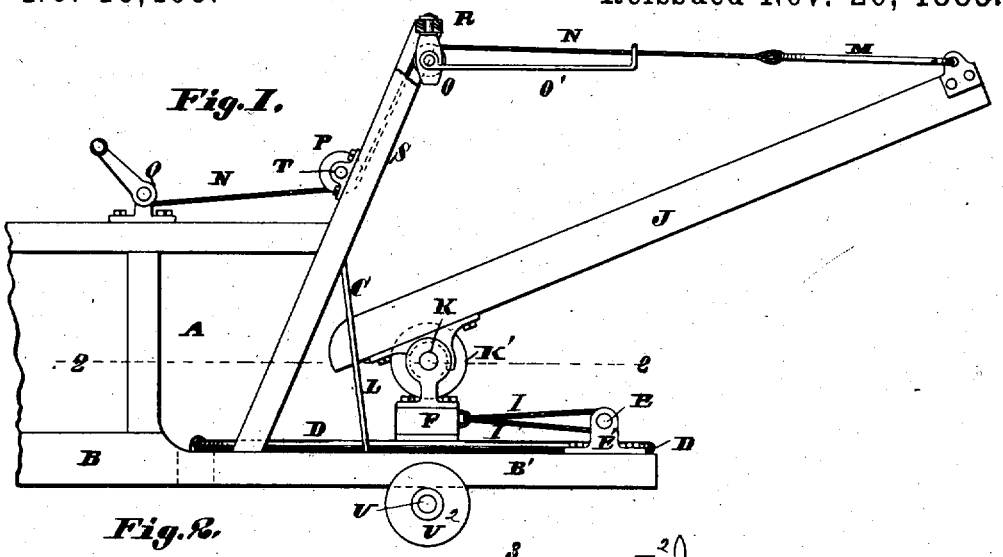
Figure 2:
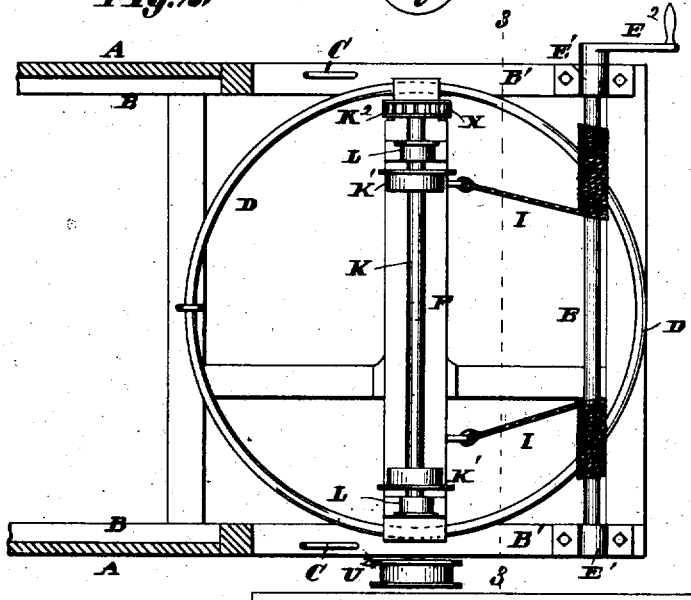
Figure 3:
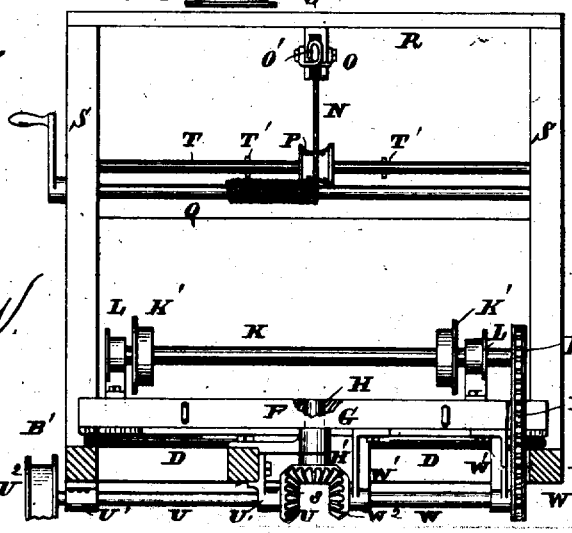

Figure 1 is a side elevation. Fig. 2 is a horizontal section taken on line 2 2, Fig. 1, the supporting-base, bolster, and track being shown in top view; and Fig. 3 is a vertical transverse section taken on line 3 3, Fig. 2.

Our invention relates to a straw-stacker for thrashing-machines, whereby means is provided for lateral and vertical adjustment of the elevator-frame; and our invention consists in features of novelty, hereinafter fully described, and pointed out in the claims.

Referring to the drawings, A represents part of a thrashing-machine, being the rear end thereof.

B represents the sills of the machine, having extensions B′, strengthened by brace-rods C, connecting them to the body of the machine, and which are designed to support the attachment. They are connected by transverse bars and framing forming a platform, on which the elevator-frame rests, bearing on a circular track, D, secured to the frame.

E represents a windlass transversely arranged at the end of the frame, being journaled in suitable boxes, E′, and provided with an operating-crank, $E^2$.

F represents the main supporting-bar or bolster, transversely arranged, and bearing on the track D and on a center bearing, G, (see Fig. 3,) through which extends a vertical pivot-bolt, H, so that the bar or bolster is allowed free horizontal vibration.

I I represent ropes or chains secured to opposite ends of the bolster, and extending back to the shaft or windlass, around which they are wound in opposite directions, so that by turning the windlass in one direction or the other the bolster is vibrated toward one side or the other.

J represents the elevator-frame, carrying the raddles, which are moved by a shaft, K, carrying pulleys K′, around which the raddle-belts pass. The shaft is journaled in suitable boxes supported by the bolster F. The elevator-frame rests on pivotal bearings L near each end of the bolster, and secured to its outer end is a bail or guys, M, to which is connected a centrally-arranged supporting rope or chain, N, which extends over a swivel-pulley, O, and under a sliding pulley, P, to a windlass, Q, which is transversely arranged on the main frame of the machine, being supported in suitable bearings. The pulley O is suspended from a transverse beam, R, which is supported by arms S, extending from and secured to the machine, and to these arms is secured by suitable bearings a shaft or rod, T, on which is the sliding pulley P, above mentioned. This sliding pulley will move endwise to accommodate itself to the rope or chain N as it is wound upon and unwound from the windlass Q. The pulley O is provided with an arm, O′, that extends forward toward the elevator-frame, embracing the rope or chain N at its outer end, but through which the rope or chain passes freely. This arm acts as a lever to turn the pulley, as the elevator-frame is vibrated, so that it will always be in line with the rope or chain, thus avoiding unnecessary friction and wear. The pulley O is located over the pivot of the bar or bolster, and this is of great practical importance, in that the rope or chain N does not tend to draw the elevator-frame into line with the machine when it is turned laterally. If the pulley were not over the pivotal center of the elevator-frame, the turning of the elevator-frame to one side or the other would increase the tension on the rope, slightly raising the outer end of the elevator-frame, and unless the elevator-frame were made fast by some secure means the rope would draw it back into line with the machine, thus causing considerable trouble and annoyance; but by placing the pulley—the bearing-point of the rope—over the pivotal center of the elevator-frame, this difficulty is completely and effectually avoided, the elevator-frame remaining in whatever position it may be put, the tension of the rope not being varied by turning the elevator-frame.

U represents a shaft located beneath the frame, and secured thereto by suitable journal-boxes, U′. (See Fig. 3.) This shaft has a pulley, $U^2$, on its outer end, which receives power from the machine, and secured to its inner end is a bevel or miter wheel, $U^3$, meshing into a similar wheel, H′, on the lower end of the pivot-bolt H.

W represents a second shaft, similar to and in line with that U, but secured to the bolster or bar F by suitable boxes, W′. On the inner end of this shaft W is a miter-wheel, $W^2$, which also meshes into the wheel H′, and on the outer end of the shaft is a wheel, $W^3$, which is connected by means of a chain belt, X, with a wheel, $K^2$, on the raddle-shaft K. It will thus be seen that the power to drive the raddles is obtained from the machine, and that the vibration of the elevator-frame turning the shaft W, changing its horizontal position, will not interfere in any way with the gearing-connection.

By our improved stacker the elevator frame can be raised or lowered or moved laterally to distribute the straw, &c., where desired.

The shaft or rod T, on which the sliding pulley P is located, may be provided with stop-pins T′, to limit the end movement of the pulley and prevent it sliding too far in either direction.

It is not absolutely necessary to have a mechanical means for moving the elevator-frame horizontally, as it may be, of course, moved by hand, by one or more persons simply pushing it to one side or the other.

By securing the stacker to the machine, instead of having it entirely separate therefrom, it always accompanies the machine, and can be quickly and easily changed from a using position to a traveling position, or vice versa, and there are many other advantages over one not secured to the machine, which it is not necessary to mention here; and by securing the frame over which the elevator-frame rope or chain passes to the machine it also accompanies the machine and is always ready for use.

We claim as our invention—

1. The combination, in a stacker, of a platform or base, an elevator-frame, a vertical pivot-pin to secure the elevator-frame to the platform, a single bevel-wheel at its lower end, two shafts mounted in the same horizontal plane, and bevel-wheels at their inner ends to mesh with the single bevel-wheel, one shaft being journaled to the elevator-frame and the other shaft being journaled to the platform, and both shafts being located beneath the platform.

2. The combination, in a stacker, of a platform or base, a bolster, a central pin, by which the bolster is pivoted to the platform, a single bevel-wheel at its lower end, two shafts, bevel-wheels at their inner ends to mesh with the single bevel-wheel, mounted in bearings in the platform and bolster, respectively, in the same horizontal plane beneath the platform, and an elevator-frame mounted on the bolster.

3. The combination of a thrashing-machine having rearwardly-extended sills to form a platform, a bolster pivoted thereto to turn thereon, an elevator-frame supported on the bolster, and a windlass in rear of the bolster, having chains or ropes wound thereon in opposite directions and connected to the bolster.

4. The combination, with a thrashing-machine, an elevator-frame, and a rope or chain extending from the elevator-frame to the machine, of arms or supports, a pulley, and a supporting-arm for the rope or chain, turning with the pulley on a vertical pivot, as set forth.

5. The combination of a thrashing-machine, an elevator-frame pivoted on the rear end thereof, rearwardly-inclined arms having a pulley pivoted in line with the pivot of the elevator-frame, a windlass mounted on the top of the machine, a supporting rope or chain extending from the elevator-frame, over the pulley, to the windlass, and a guide-roller between the point of bearing on the pulley and windlass, as set forth.

6. The combination of a thrashing-machine, an elevator-frame pivoted on the rear end thereof, rearwardly-inclined arms having a pulley pivoted in line with the pivot of the elevator-frame, a windlass mounted on the top of the machine, a sliding roller mounted on a rod secured to the arms, having stops to limit the movement of the roller sidewise, and a chain or rope extending from the top of the elevator-frame to the windlass, over the pulley and under the roller, as set forth.

DUDLEY D. SPRAGUE.
PEARLEY J. SPRAGUE.

Witnesses to the signature of Dudley D. Sprague:
GEO. H. KNIGHT,
SAML. KNIGHT.

Witnesses to the signature of Pearley J. Sprague:
JOS. J. BROWN,
THOS. J. MOSS.